(12) United States Patent
Burleson

(10) Patent No.: US 10,202,080 B1
(45) Date of Patent: Feb. 12, 2019

(54) DETACHABLE FOOTSTEP FOR STAKE POCKETS ON A TRAILER

(71) Applicant: Michael Dwaine Burleson, Fort Worth, TX (US)

(72) Inventor: Michael Dwaine Burleson, Fort Worth, TX (US)

( * ) Notice: Subject to any disclaimer, the term of this patent is extended or adjusted under 35 U.S.C. 154(b) by 0 days.

(21) Appl. No.: 16/007,766

(22) Filed: Jun. 13, 2018

Related U.S. Application Data

(60) Provisional application No. 62/607,213, filed on Dec. 18, 2017.

(51) Int. Cl.
*B60R 3/00* (2006.01)

(52) U.S. Cl.
CPC .................... *B60R 3/007* (2013.01)

(58) Field of Classification Search
CPC ..................................... B60R 3/007
See application file for complete search history.

(56) References Cited

U.S. PATENT DOCUMENTS 8,967,650 B1 * 3/2015 Majors ...................... B60R 3/00
280/163

* cited by examiner

*Primary Examiner* — James A Shriver, II
*Assistant Examiner* — James J Triggs

(57) ABSTRACT

A detachable footstep for stake pockets on a trailer allows passengers to board and dismount the trailer. The detachable footstep includes a frame, a footstep, a slip-guard, and a connector-locking mechanism. The footstep and the connector-locking mechanism are mounted on opposite ends of the frame. The connector-locking mechanism is a mechanical lock that attaches the frame to the stake pocket. The footstep is a sturdy rigid member capable supporting the passenger's weight as the passenger boards the trailer. The slip-guard is made of high-grip materials to help the passenger gain a secure foothold on the footstep.

17 Claims, 13 Drawing Sheets

DETACHABLE FOOTSTEP FOR STAKE POCKETS ON A TRAILER

The current application claims a priority to the U.S. Provisional Patent application Ser. No. 62/607,213 filed on Dec. 18, 2017.

FIELD OF THE INVENTION

The present invention generally relates to a detachable footstep for stake pockets on a trailer. More specifically, a frame horizontally and vertically offsets a footstep from the trailer, thereby allowing a user to gain secure foothold to board the trailer.

BACKGROUND OF THE INVENTION

Trailers are unpowered vehicles used to transport goods and materials with the help of powered vehicles. Trailers, referred to herein, have a wheeled frame that is coupled to a powered vehicle via a trailer hitch. Powered vehicles refer to conventional automobiles including, but not limited to, passenger cars, pickup trucks, semi-trucks, and the like. Generally, trailers are used to transport heavy cargo in bulk. These trailers are usually 45 to 75 feet in length and have ride heights ranging from 20 inches to 40 inches. As one can imagine, the considerable height of the trailers makes it very difficult for users to board the trailers. Further, given the considerable elevation, users must jump to dismount the trailer. This problem is exacerbated for elderly users who have considerable difficulty boarding the trailers due to the loss some of their physical strength. Further, jumping to dismount the trailer can gravely injure elderly users.

There are a variety of devices and solution aimed at resolving this issue. One such solution would be to include a common footstool on the ground next to the trailer. However, this solution could be unsafe because the user could easily lose their balance while standing atop of the footstool, especially if the footstool is placed atop uneven or slippery surfaces. Additionally, there are also retrofittable ladders that can be attached to the sides of the trailer. These ladders are attached to the stake pockets of the trailer. However, these devices require multiple stake pockets to be attached to the side of the trailer, which means these devices can be bulky and heavy to attach and detach from side of the trailer. Also, some of these devices utilize plier-like clips to attach to the side of the trailer, which are difficult to handle and grasp, as the devices are attached to the side of the trailer. Other devices include a stake that is inserted through the stake pocket with a pin that goes through the device and stake pocket. However, this can cause unnecessary strain and stress on the stake pocket of the trailer.

An objective of the present invention is to provide users with a detachable footstep for use with trailers and other similar objects. The present invention is intended to be attached to the stake pocket in a convenient and ergonomic manner. The present invention intends to be light weight and easy to handle. The present invention intends to reduce the amount of stress and strain on both the present invention and the stake pocket of trailer. The present invention intends to prevent slip or a misstep as the user steps upon the present invention.

DETAILED DESCRIPTION OF THE INVENTION

All illustrations of the drawings are for the purpose of describing selected versions of the present invention and are not intended to limit the scope of the present invention.

Figure 1:
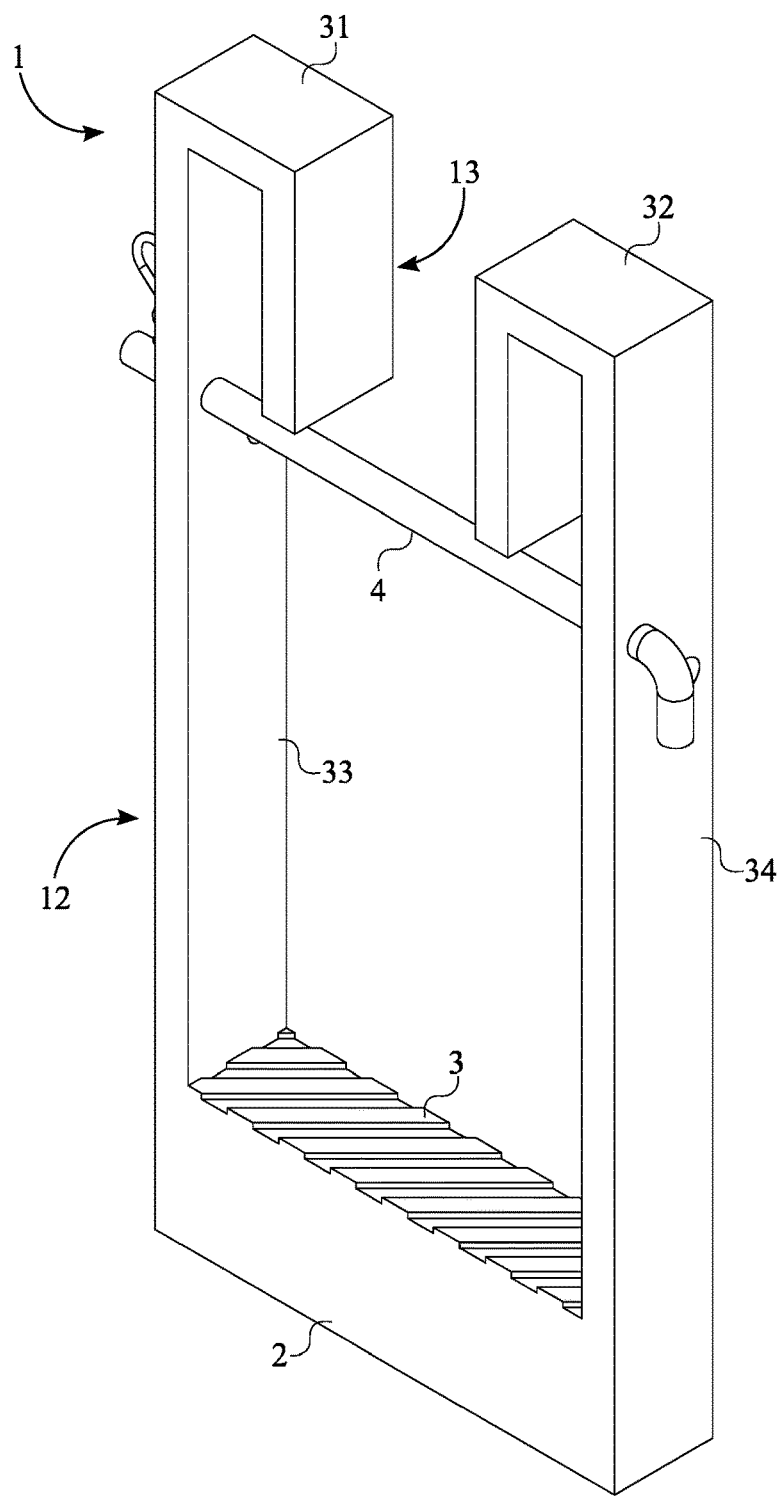
FIG. 1 is a front perspective view of an exemplary embodiment of the present invention.

The present invention is a detachable footstep for stake pockets on a trailer. Conventionally, stake pockets are used to erect a barrier around the trailer. In the preferred implementation, the stake pockets are used to retrofit stepping platforms that allow users to climb onto the trailer. Referring to FIG. 1, the preferred embodiment of the present invention comprises a frame 1, a footstep 2, a slip-guard 3, and a connector-locking mechanism 4. The frame 1 comprises an offsetting structure 12 and a pocket connector 13. Preferably, the footstep 2 is terminally mounted to the offsetting structure 12. As such, the offsetting structure 12 moves the footstep 2 closer to the ground and allows the user to easily gain a foothold to board the trailer. Additionally, lowering the footstep 2 also creates a clearance between the footstep 2 and the trailer for the user's foot. Similarly, the pocket connector 13 is terminally mounted to the offsetting structure 12, opposite the footstep 2. The pocket connector 13 latches onto the stake pocket thereby connecting the footstep 2 onto the trailer. Further, by terminally connecting the pocket connector 13 onto the frame 1, the clearance between the trailer and the footstep 2 is maximized. Preferably, the slip-guard 3 is mounted onto the footstep 2, directly beneath the user's foot. The preferred slip-guard 3 may comprise metallic or plastic studs that prevents the user's foot from slipping. Finally, the connector-locking mechanism 4 is operatively integrated into the frame 1, wherein the connector-locking mechanism 4 is used to hold the pocket connector 13 is place. More specifically, the connector-locking mechanism 4 secures the footstep 2 against vibrations and turbulence generated when the trailer travels over rough and uneven terrain. As such, the connector-locking mechanism 4 prevents the pocket connector 13 from being dislodged from the stake pocket.

Figure 2:
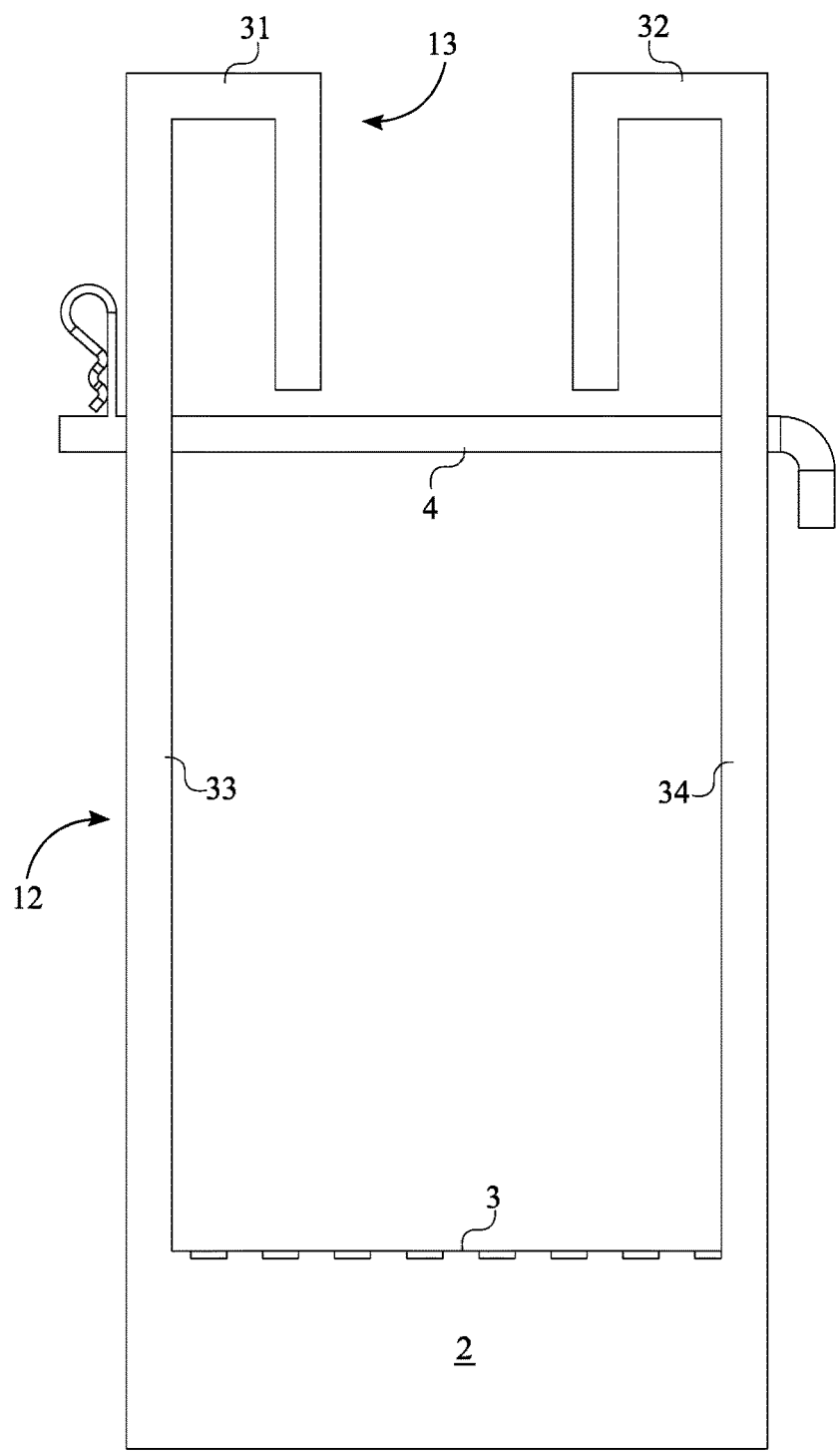
FIG. 2 is a front view of the exemplary embodiment illustrating the first sidewall and the second sidewall of the offsetting structure.

Referring to FIG. 2, in the preferred embodiment, the pocket connector 13 comprises a first hook 31 and a second hook 32. The first hook 31 and the second hook 32 connect to opposite sides of the stake pocket. The offsetting structure 12 comprises a first sidewall 33 and a second sidewall 34. The first sidewall 33 and the second sidewall 34 are positioned parallel and offset to each other. The footstep 2 is terminally connected in between the first sidewall 33 and the second sidewall 34. In the preferred implementation, the first sidewall 33 and the second sidewall 34 help center the user's foot on the footstep 2. The height of the first sidewall 33 and the second sidewall 34 determines the clearance between the pocket connector 13 and the footstep 2 for the user's foot. Similarly, the offset between the first sidewall 33 and the second sidewall 34 determines the length of the footstep 2. The offset may be increased to accommodate wider stake pockets or reduced to accommodate narrower stake pockets. Alternately, the first sidewall 33 and the second sidewall 34 may be oriented at an angle to each other to accommodate different sized stake pockets without altering the length of the footstep 2. The first hook 31 is terminally connected to the first sidewall 33, opposite to the footstep 2. Similarly, the second hook 32 is terminally connected to the second sidewall 34, opposite to the footstep 2. Preferably, both the first hook 31 and the second hook 32 are formed by bending ends of the first sidewall 33 and second sidewall 34 inwards. As a result, the first hook 31 and the second hook 32 are pointed towards each other. To successfully engage stake pockets of varying widths, a gap of the first hook 31 and the second hook 32 can be adjusted. By increasing the gap, first hook 31 and the second hook 32 can engage a narrow stake pocket. By reducing the gap, the first hook 31 and the second hook 32 can engage a wide stake pocket. In both cases, the gap is sized so that the stake pocket is centered on the footstep 2 when engaged.

Figure 3:
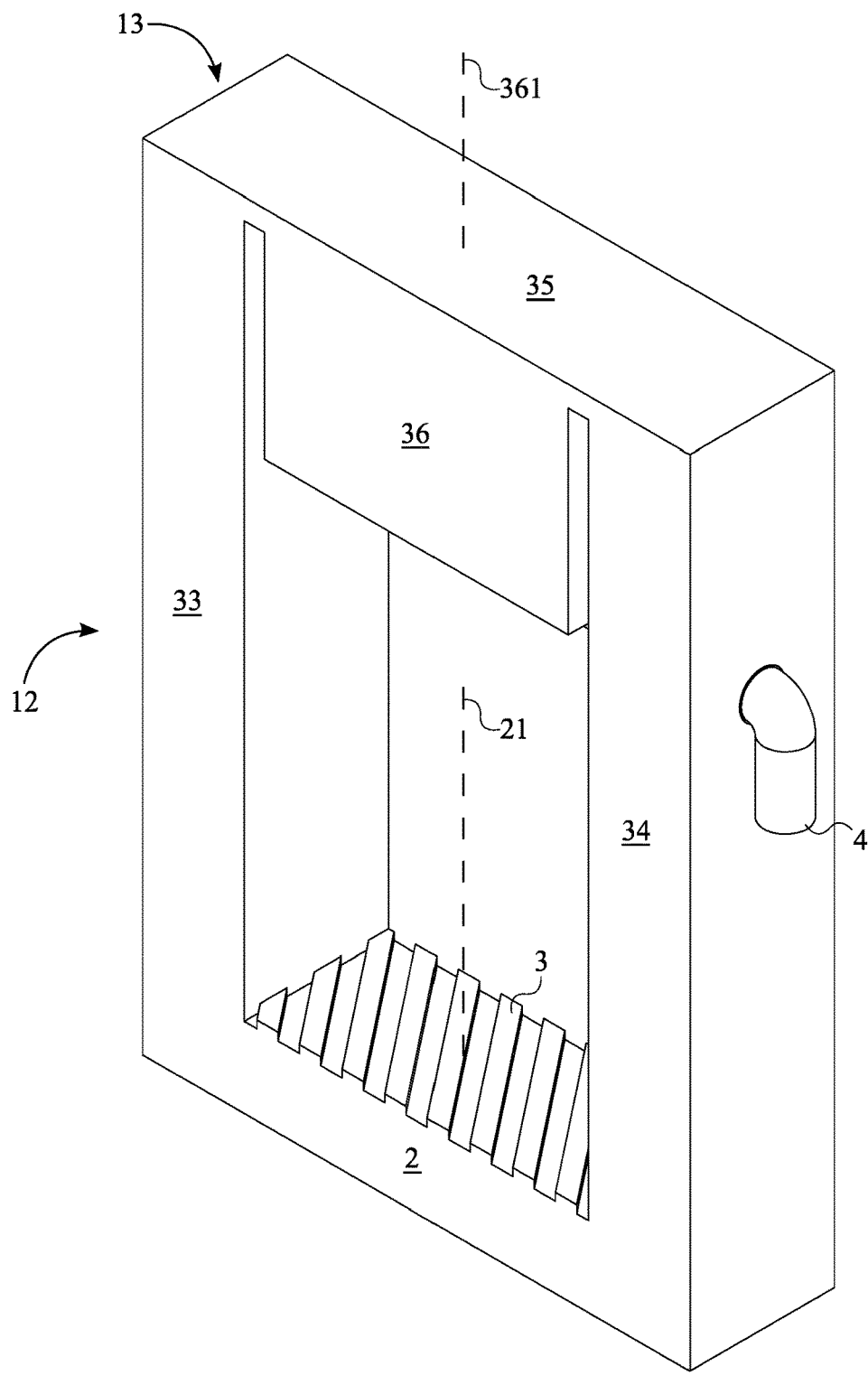
FIG. 3 is a front perspective view illustrating the tube positioned coincident and parallel to the footstep.

Referring to FIG. 3, in an alternate embodiment of the present invention, the pocket connector 13 comprises a base plate 35 and a tube 36. The base plate 35 secures the frame 1 against vertical loads and vibrations, whereas the tube 36 secures the frame 1 against lateral loads and vibrations. Similar to the preferred embodiment, the offsetting structure 12 comprises a first sidewall 33 and a second sidewall 34. Further, the footstep 2 is terminally connected in between the first sidewall 33 and the second sidewall 34. At the opposite end of the footstep 2, the base plate 35 helps secure the frame 1 to the stake pocket. As such, the base plate 35 is terminally connected in between the first sidewall 33 and the second sidewall 34, opposite the footstep 2. Preferably, the base plate 35 is a flat rigid plate that rests on top of the stake pocket. In addition to supporting the vertical load of the offsetting structure 12 and the footstep 2, the base plate 35 also secures the frame 1 against the vertical forces and vibrations. Likewise, the tube 36 secures the frame 1 against lateral vibrations and forces. As such, the tube 36 is connected onto the base plate 35. Further, the tube 36 is oriented towards the footstep 2. In the preferred embodiment, the tube 36 is a hollow square protrusion extending perpendicular to the base plate 35. Alternately, the tube 36 may have any cross-sectional shape to accommodate the shape of the stake pocket. The tube 36 is manufactured with fine tolerances to minimize the clearance between the walls of the stake pocket and the tube 36. Minimizing the clearance between the tube 36 and the stake pocket prevents the frame 1 from sliding and swaying when the trailer is accelerating and decelerating.

Figure 4:
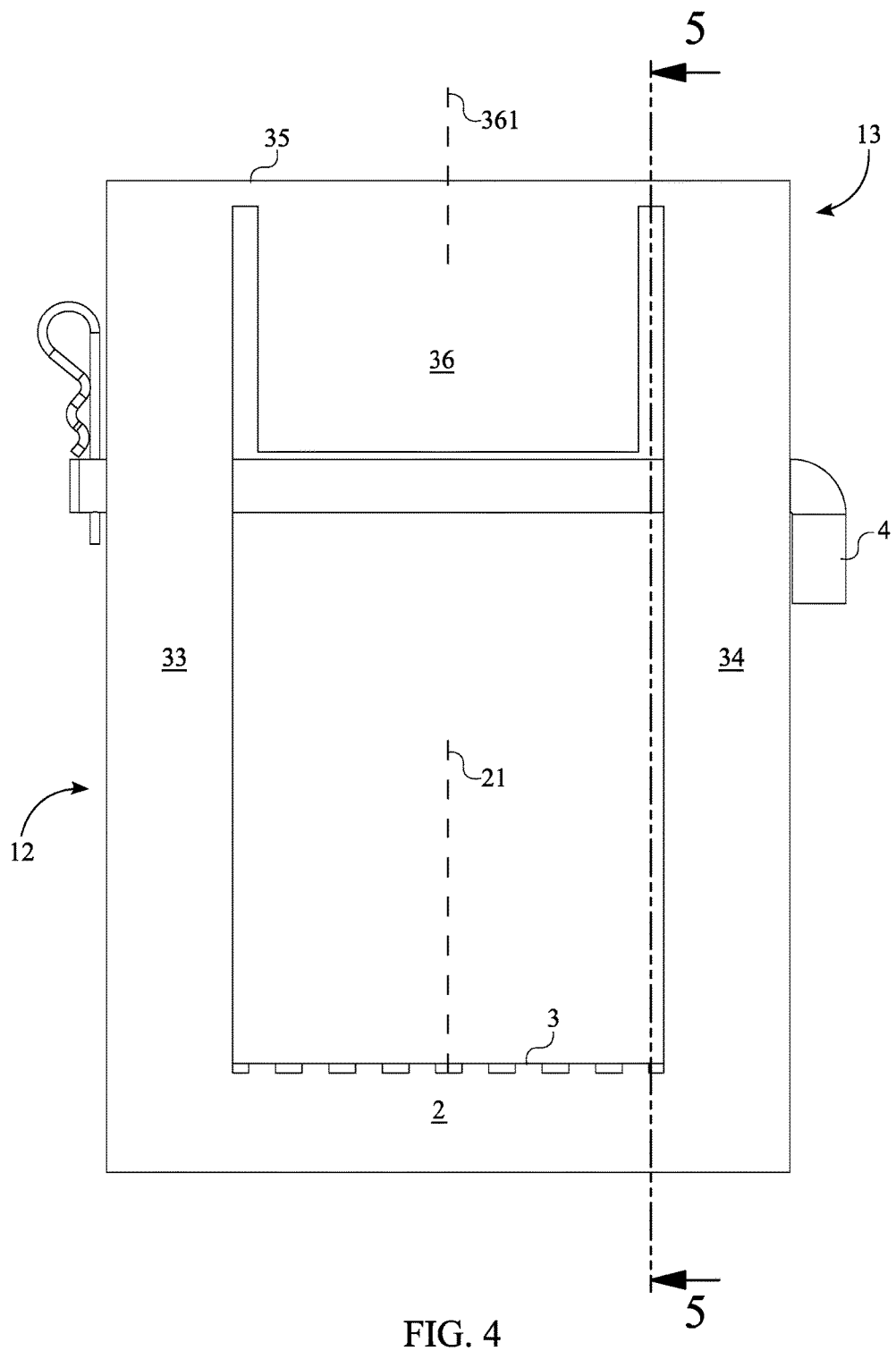
FIG. 4 is a front plan view illustrating thereof.
Figure 5:
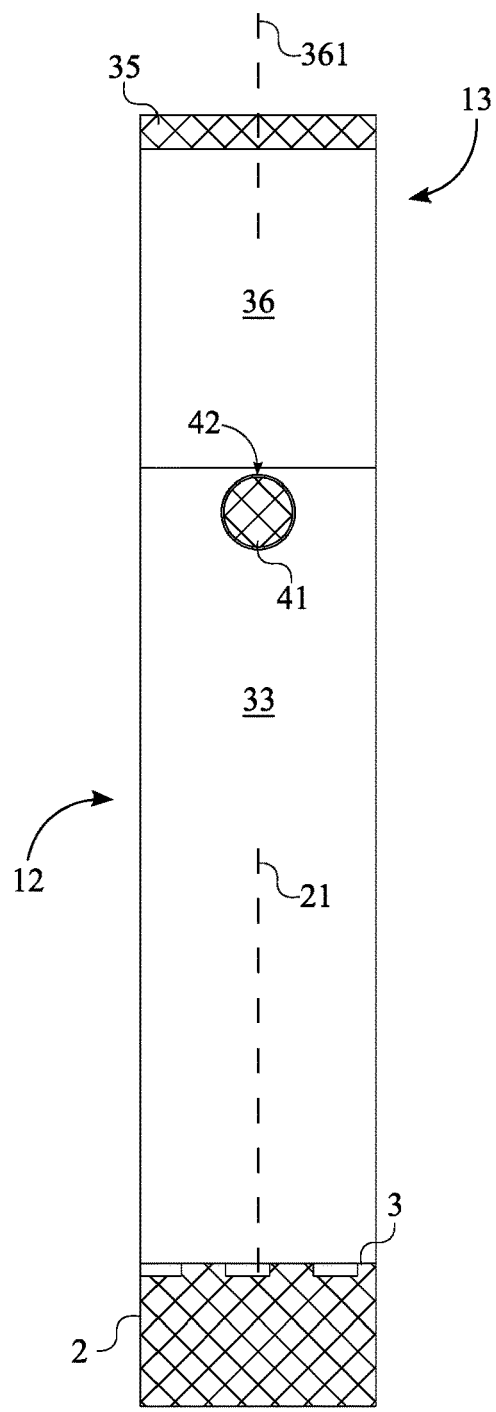
FIG. 5 is a cross section view taken along line 5-5 in FIG. 4 illustrating the at least one pin slot traversing through the offsetting structure.
Figure 12:
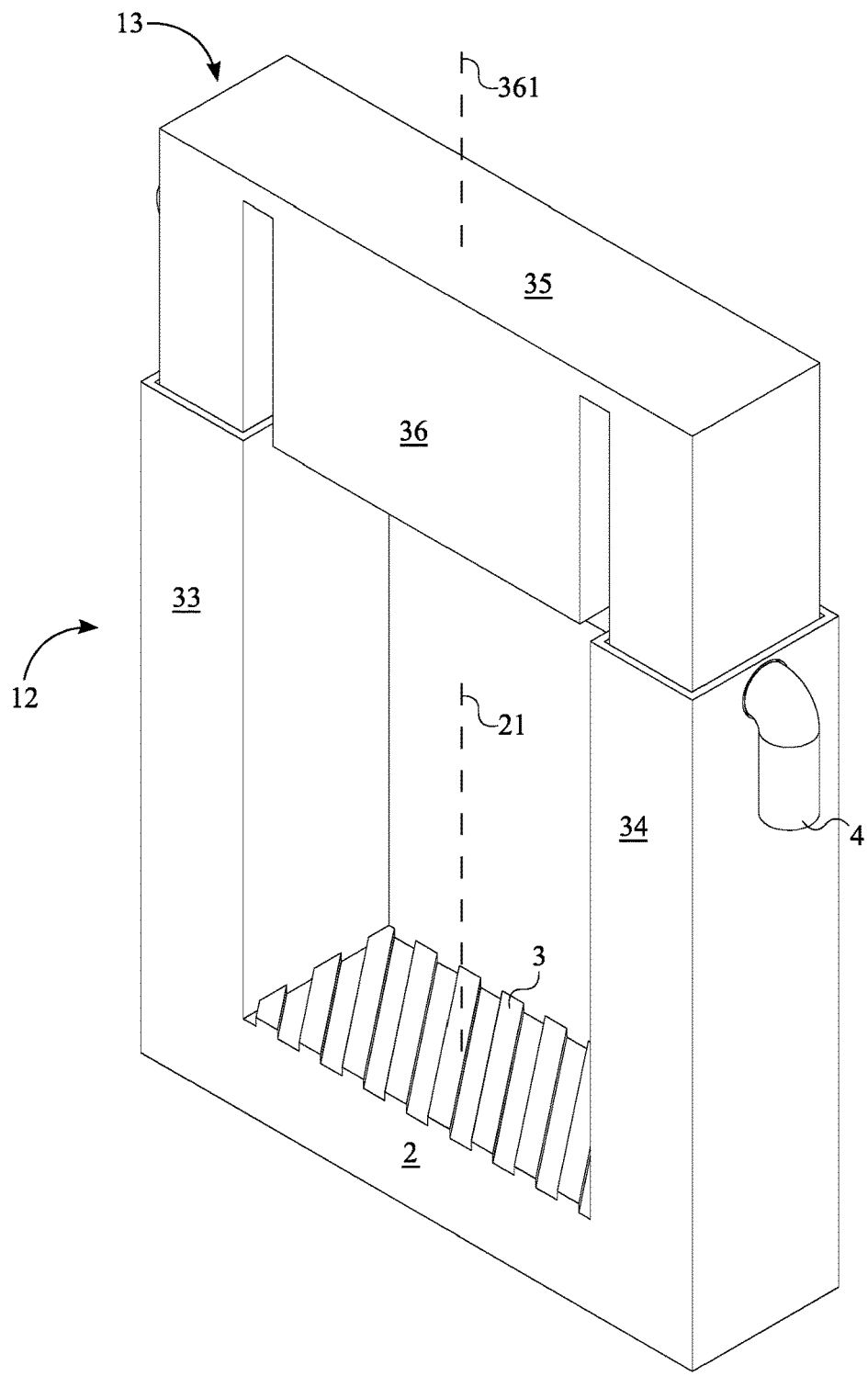
FIG. 12 is a front perspective view illustrating the first U-shaped tube inserted into the second U-shaped tube.
Figure 13:
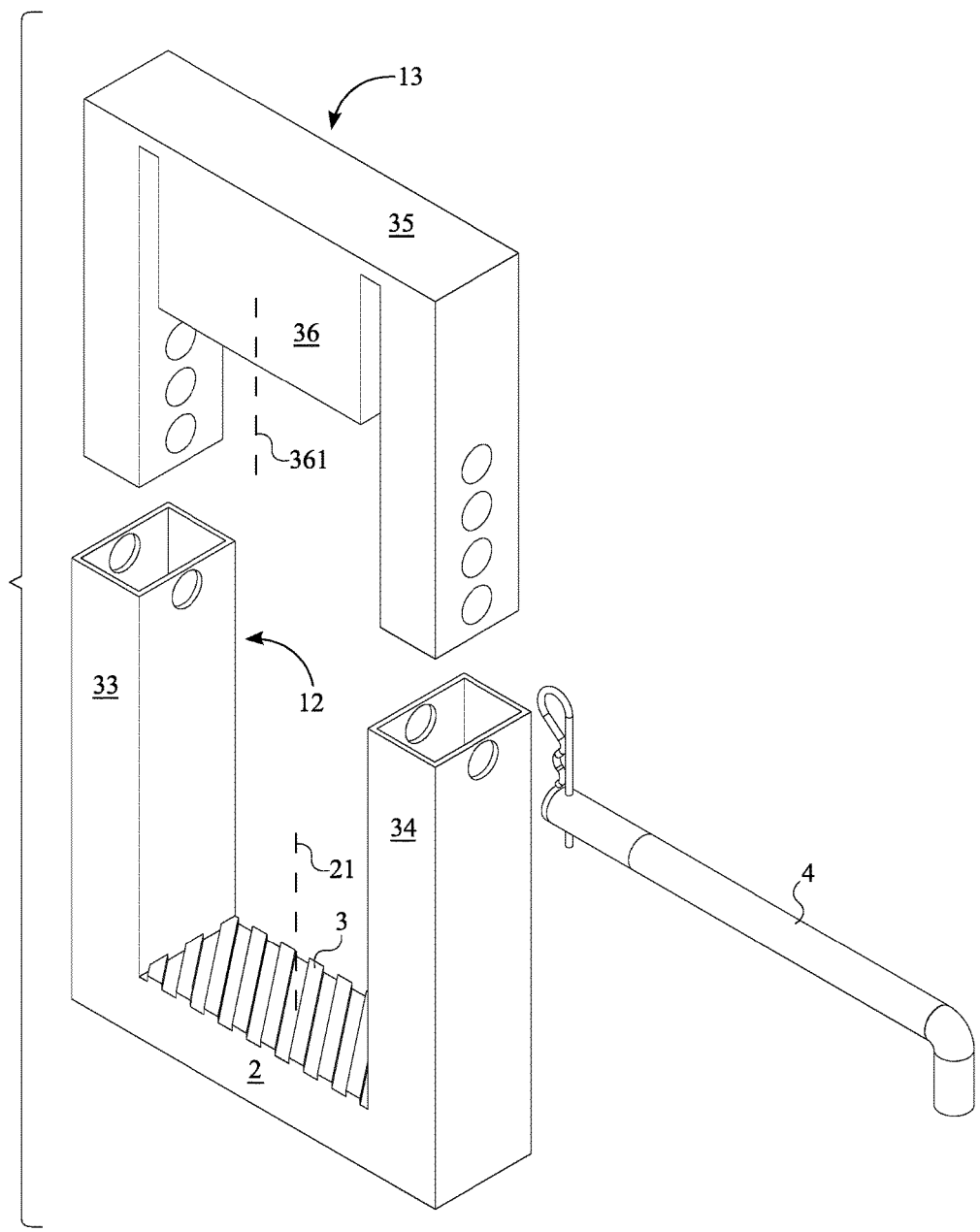
FIG. 13 is an exploded view illustrating the plurality of positioning slots traversing through the pair of upper legs.

Referring to FIG. 4 and FIG. 5, to further stabilize the frame 1, the footstep 2 is positioned level with the trailer and the ground. This helps the user maintain balance while stepping on the footstep 2. As such, a central axis 361 of the tube 36 is positioned parallel and coincident with a normal axis 21 of the footstep 2. The central axis 361 of the tube 36 is preferably oriented normal to the tube 36 and traverses through the tube 36. Consequently, the central axis 361 is also oriented normal to the base plate 35. In the attached position, both the normal axis 21 and the central axis 361 are oriented coincident and parallel to the vertical axis of the stake pocket. Further, the footstep 2 is positioned directly beneath the tube 36 and adjacent to the side of the trailer. This minimizes the effective width of the trailer and prevents the trailer from Referring FIG. 12 and FIG. 13, in yet another embodiment, the offsetting structure 12 may comprise a first U-shaped tube and a second U-shaped tube. In the preferred implementation, a pair of upper legs of the first U-shaped tube slidably inserts into a pair of lower legs of the second U-shaped tube. More specifically, each of the pair of upper legs slidably inserts into an insertion slot of each of the pair of lower legs. As such, the user can adjust the clearance between the footstep 2 and the tube 36 to make room for stake pockets of varying lengths. To lock the position of the first U-shaped tube, a plurality of positioning slots traverses through each of the pair of upper legs. Further, the at least one pin slot 42 traverses through the second U-shaped tube. To engage the locking mechanism, the at least one pin slot 41 is concentrically aligned with a corresponding slot from the plurality of positioning slots. The locking pin then traverses through the at least one pin slot and the corresponding slot, thus connecting the first U-shaped tube to the second U-shaped tube.

Figure 6:
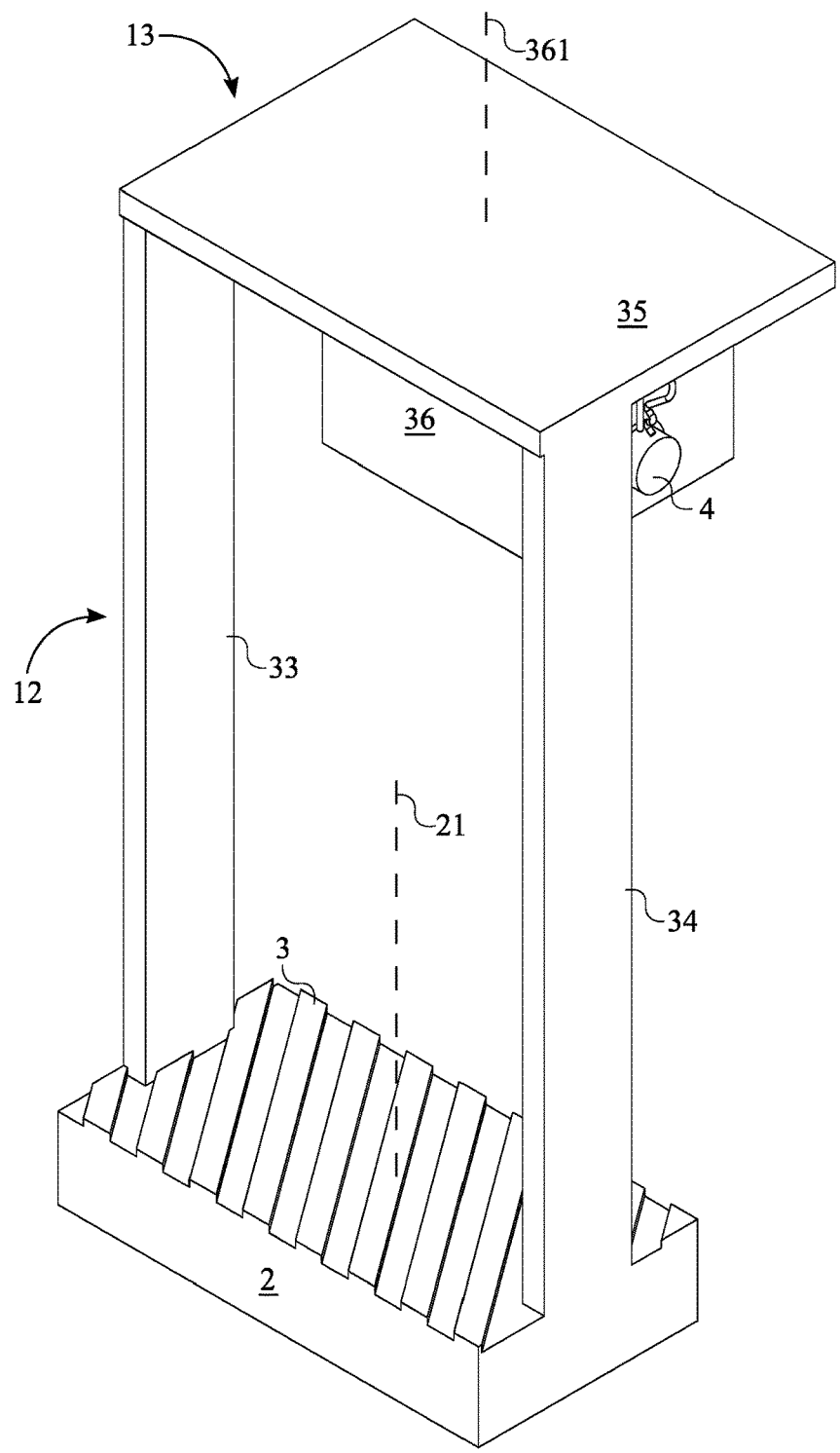
FIG. 6 is a front perspective view illustrating the tube positioned offset and parallel to the footstep.
Figure 7:
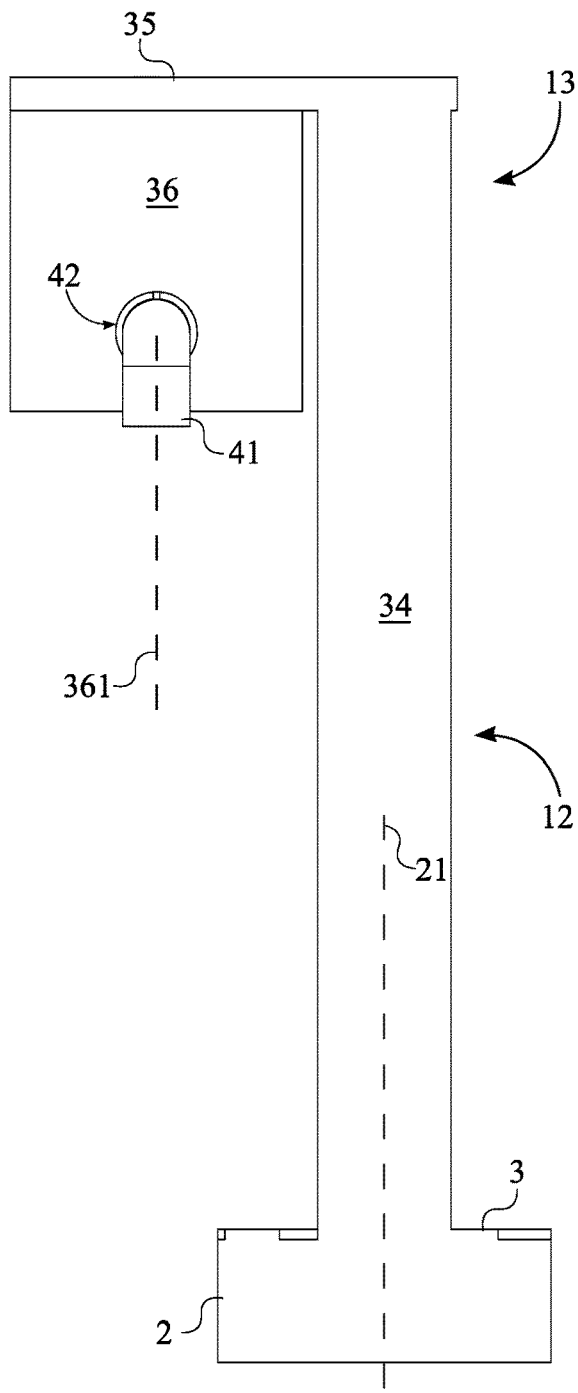
FIG. 7 is a side view thereof illustrating the at least one pin traversing through the tube.

Referring to FIG. 6 and FIG. 7, if there is additional clearance on the side of the trailer, the footstep 2 can be horizontally offset from the trailer. More specifically, a central axis 361 of the tube 36 is positioned parallel and offset with a normal axis 21 of the footstep 2. This creates space for the user's legs and knee when boarding the trailer.

Referring back to FIG. 5, the connector-locking mechanism 4 prevents the frame 1 from getting dislodged from the stake pocket when the trailer goes over uneven terrain. The preferred embodiment of the connector-locking mechanism 4 comprises a securing pin 41 and at least one pin slot 42. The securing pin 41 is a L-shaped rod secured via a cotter pin. In the preferred embodiment, the at least one pin slot 42 is positioned adjacent to the pocket connector 13. Further, the at least one pin slot 42 traverses through the offsetting structure 12. This configures the connector-locking mechanism 4 to lock the stake pocket between the pocket connector 13 and the securing pin 41. Accordingly, the at least one pin slot 42 is engaged by the securing pin 41. To connect the securing pin 41 to the offsetting structure 12, the securing pin 41 is inserted into the at least one pin slot 42. A leg of the Securing pin 41 prevents the securing pin 41 from sliding further into the at least one pin slot 42. Similarly, the cotter pin engages at the opposite end, prevents the securing pin 41 from sliding out of the at least one pin slot 42. To remove the securing pin 41, the cotter pin is removed, and the securing pin 41 slides out of the at least one pin slot 42. The securing pin 41 prevents the pocket connector 13 from dislodging from the stake pocket due to vibrations in the vertical direction. These vibrations may be caused when the trailer travels over rough or uneven terrain.

Figure 10:
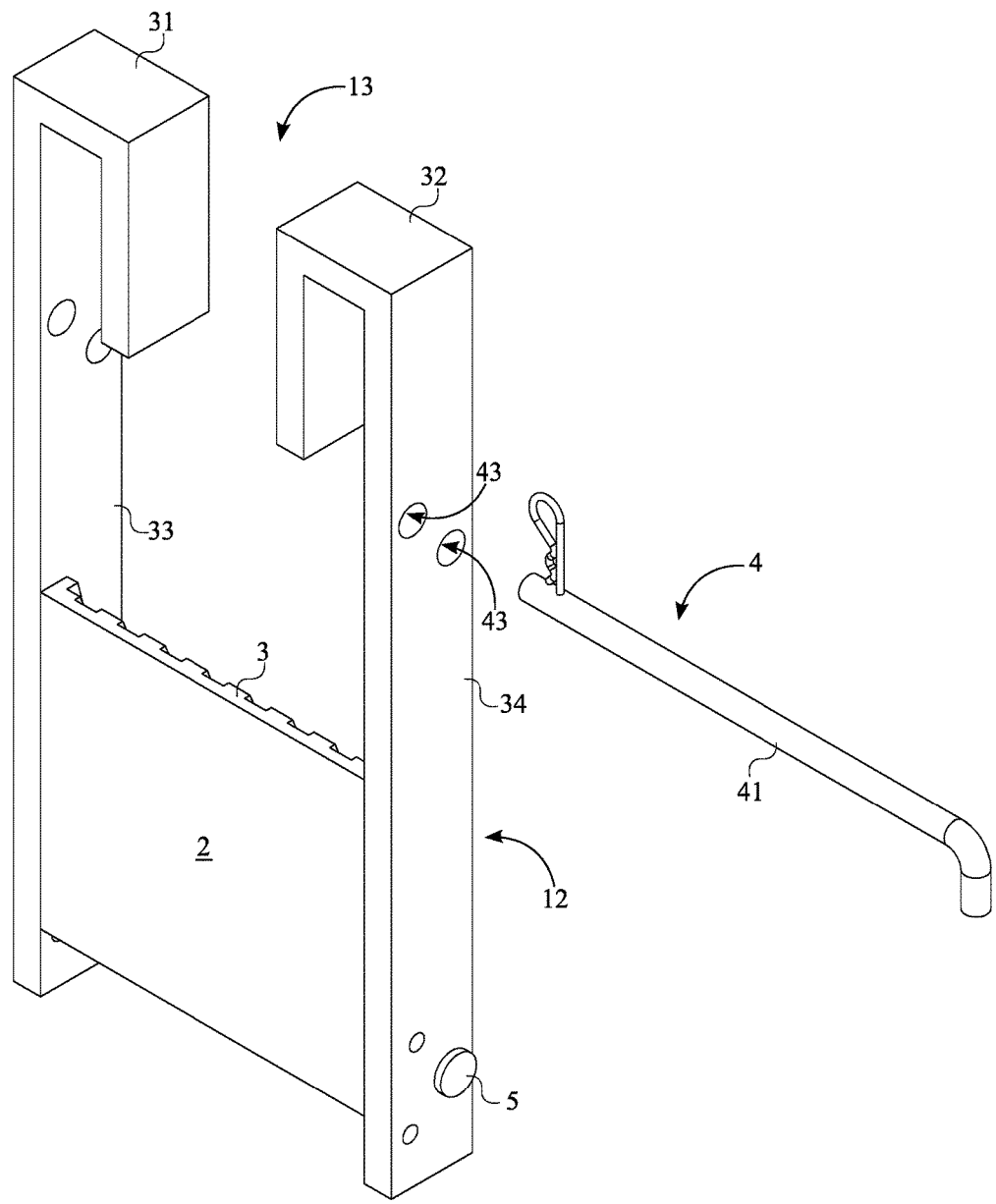
FIG. 10 is a front perspective view illustrating the spring-loaded actuator coupled to an offsetting structure with a plurality of pin slots, wherein the footstep is in a retracted position.

As can be seen in FIG. 10, in an alternate embodiment of the present invention, the at least one pin slot 42 is a plurality of pin slots 43. The plurality of pin slots 43 is positioned along the offsetting structure 12. The plurality of pin slots 43 repositions the securing pin 41 to accommodate stake pockets of varying lengths. For example, to accommodate a longer stake pocket, the securing pin 41 may be engaged to a pin slot positioned further down the offsetting structure 12. In the preferred implementation, the plurality of pin slots 43 is positioned in a slanted arrangement to the offsetting structure 12. Alternately, the plurality of pin slots 43 may be positioned in a vertical arrangement to the offsetting structure 12.

Referring back to FIG. 7, in yet another embodiment, the connector-locking mechanism 4 may be mounted to the pocket connector 13 itself. More specifically, the at least one pin slot 42 traverses through the pocket connector 13. Further, the at least one pin slot 42 is positioned offset from the offsetting structure 12. As a result, the at least one pin slot 42 traverses through the tube 36 of the pocket connector 13. To lock the stake pocket onto the pocket connector 13, the at least one pin slot 42 is engaged by the securing pin 41. Once engaged, the stake pocket is thus locked between the base plate 35 of the pocket connector 13 on one side and the securing pin 41 of the connecting mechanism on the other.

Figure 8:
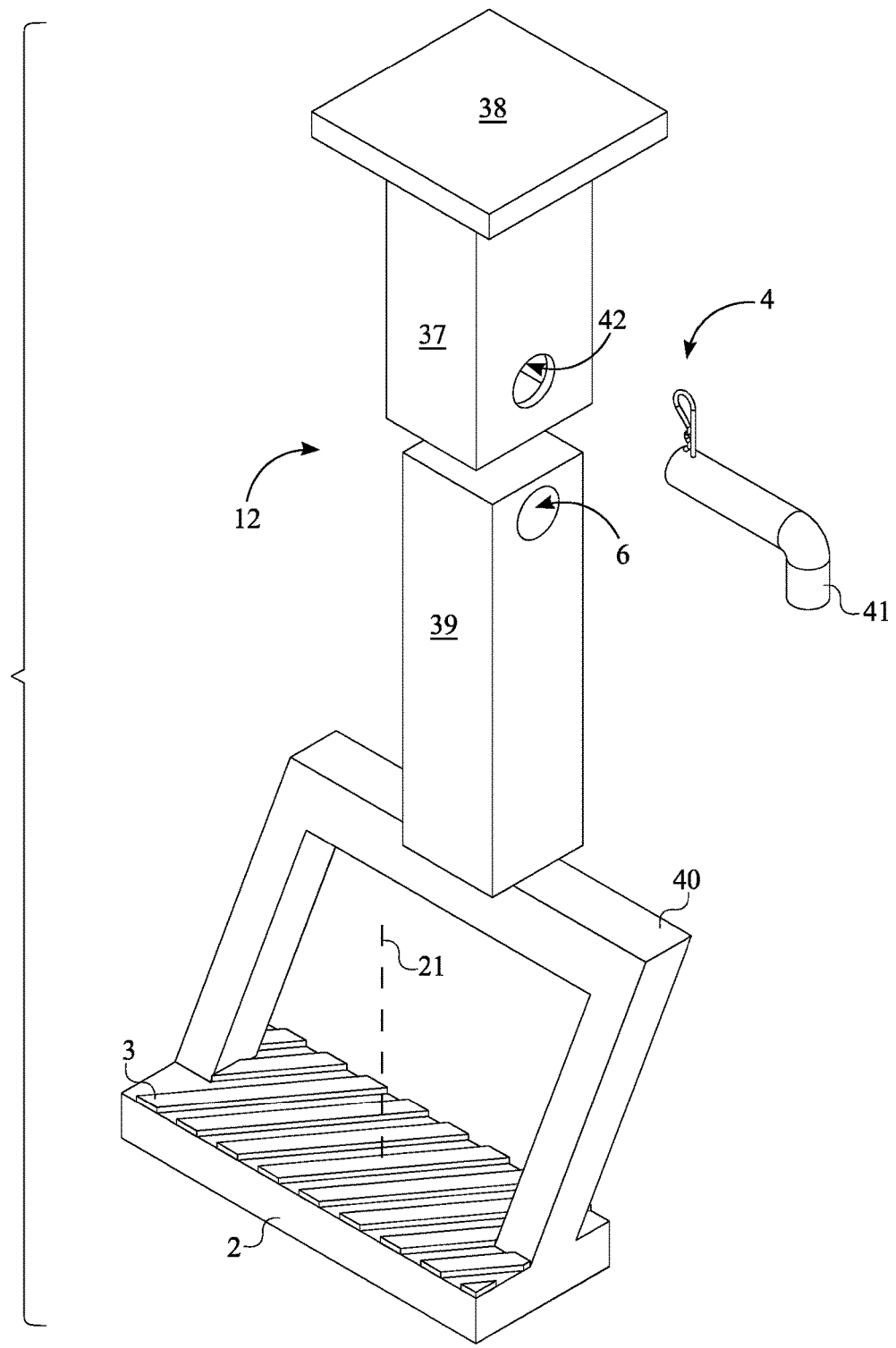
FIG. 8 is an exploded perspective view illustrating the male tube and the female tube of the offsetting structure.
Figure 9:
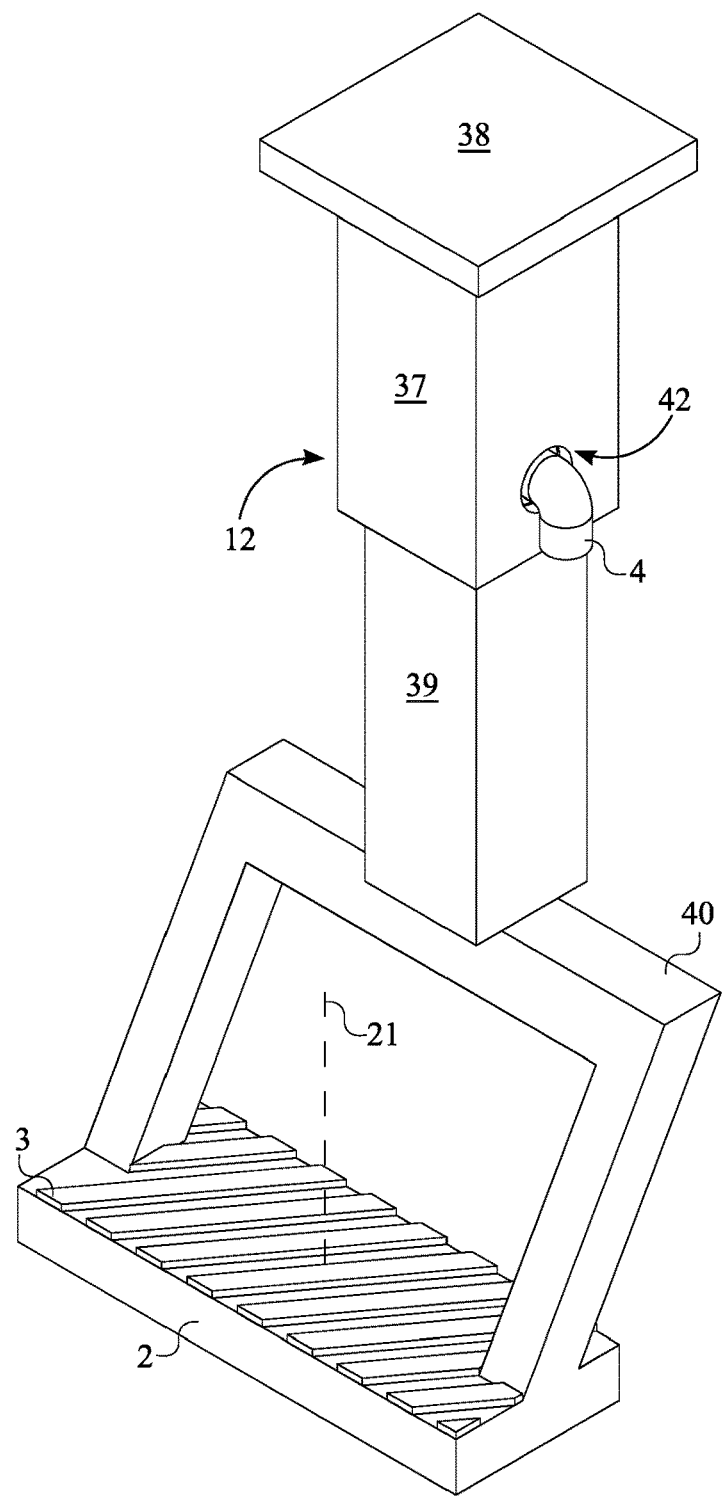
FIG. 9 is a front perspective view illustrating the male tube engaged to the female tube by the connector locking mechanism.

Referring to FIG. 8 and FIG. 9, in yet another embodiment, the pocket connector 13 comprises a female tube 37 and a flange 38. Accordingly, the offsetting structure 12 comprises a male tube 39 and an angled mount 40. Preferably, both the male tube 39 and the female tube 37 are rectangular prisms. Alternately, the male tube 39 and the female tube 37 may be any shape or size. The flange 38 is terminally connected to the female tube 37. Preferably, the flange 38 is flat square stopper attached to the top of the female tube 37, that prevents female tube 37 from going through the stake pocket. Once the female tube 37 is fastened onto the stake pocket, the male tube 39 is engaged to the female tube 37, opposite the flange 38. More specifically, the male tube 39 inserts into the female tube 37. Thereafter, the connector-locking mechanism 4 securely fastens the male tube 39 onto the female tube 37. The angled mount 40 is terminally connected to the male tube 39, opposite the female tube 37. Preferably, the angled mount 40 is a square frame that is tilted about the male tube 39. The footstep 2 is mounted onto the angled mount 40, offset from the male tube 39. More specifically, the footstep 2 is both horizontally and vertically offset from the male tube 39 to maximize the space for the user's leg and knees.

To fasten the male tube 39 to the female tube 37, the connector-locking mechanism 4 comprises a securing pin 41, at least one pin slot 42, and a locking slot 6. The locking slot 6 laterally traverses through the female tube 37, offset from the flange 38. The at least one pin slot 42 traverses through the male tube 39, offset from the angled mount 40. Once the male tube 39 is fitted into the female tube 37, the at least one pin slot 42 and the locking slot 6 are concentrically aligned. Accordingly, the securing pin 41 is engaged through the locking slot 6 and the at least one pin slot 42. This creates an interlocking engagement between the male tube 39 and the female tube 37.

Figure 11:
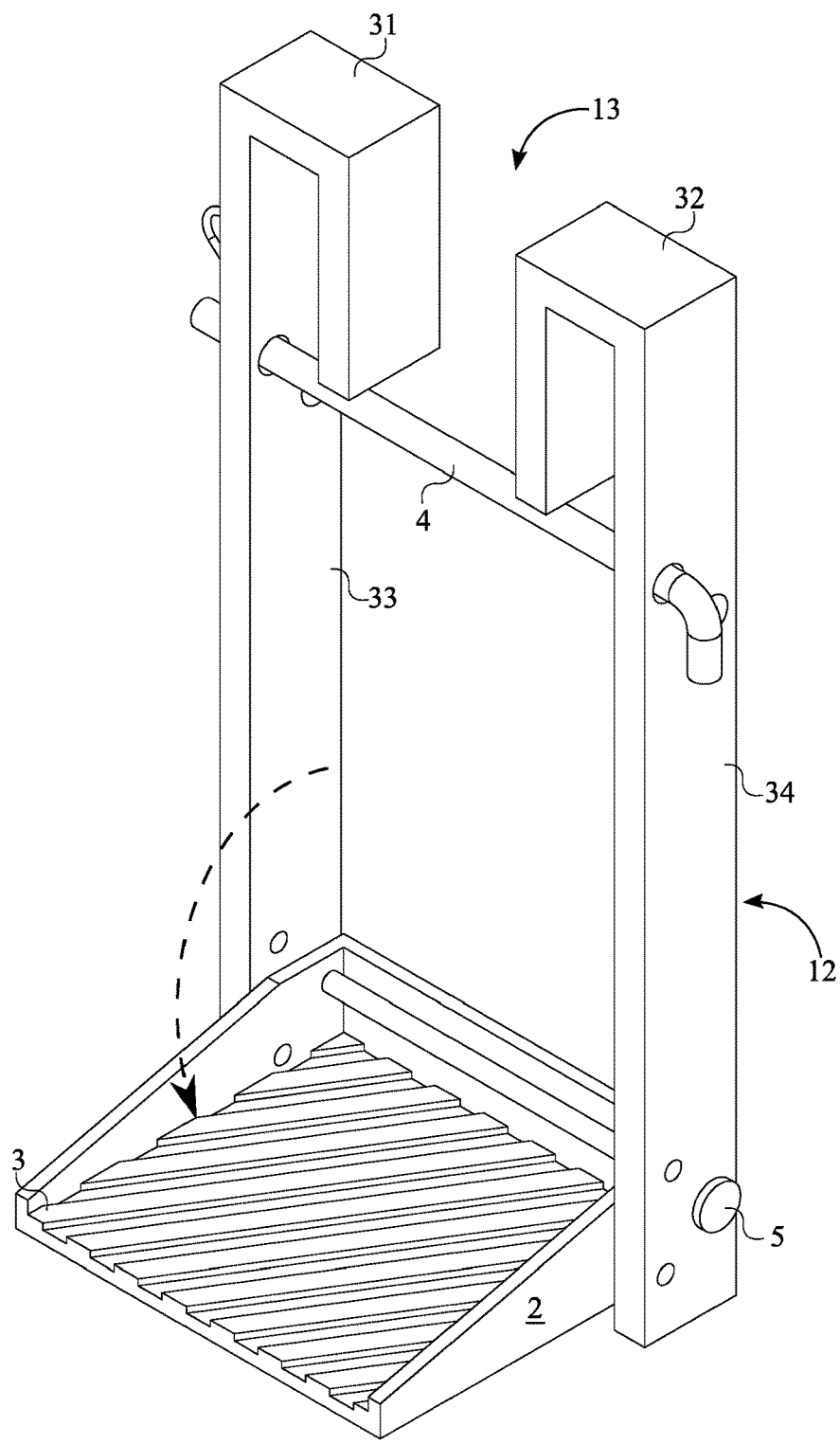
FIG. 11 is a front perspective view illustrating thereof, wherein the footstep is in the extended position.

Referring to FIG. 10 and FIG. 11, in yet another embodiment of the present invention, a spring-loaded actuator 5 is used to selectively extend the footstep 2. More specifically, the footstep 2 is rotatably connected to the offsetting structure 12. The spring-loaded actuator 5 is operatively integrated into the rotatable connection between the footstep 2 and the offsetting structure 12, wherein the spring-loaded actuator 5 is used to selectively position the footstep 2 perpendicular to the offsetting structure 12. More specifically, the spring-loaded actuator 5 provides a continuous torque which forces the footstep 2 into a perpendicular orientation with the offsetting structure 12. To retract the footstep 2 back into the offsetting structure 12, the footstep 2 is manually rotated into a vertical position and a locking pin is used to lock the position. The locking pin preferably connects into a pin hole positioned directly over the axis of rotation. Inserting the locking pin into the pin hole prevents the spring-loaded actuator 5 from extending the footstep 2.

Although the invention has been explained in relation to its preferred embodiment, it is to be understood that many other possible modifications and variations can be made without departing from the spirit and scope of the invention as hereinafter claimed.

What is claimed is:

1. A detachable footstep for stake pockets on a trailer comprises:
    a frame;
    a footstep;
    a slip-guard;
    a connector-locking mechanism;
    the frame comprises an offsetting structure and a pocket connector;
    the footstep being terminally mounted to the offsetting structure;
    the pocket connector being terminally mounted to the offsetting structure, opposite the footstep;
    the slip-guard being mounted onto the footstep;
    the connector-locking mechanism being operatively integrated into the frame, wherein the connector-locking mechanism is used to hold the pocket connector in place;
    the connector-locking mechanism comprises a securing pin and at least one pin slot;
    the at least one pin slot traversing through the offsetting structure;
    the at least one pin slot being positioned adjacent to the pocket connector;
    the at least one pin slot being engaged by the securing pin;
    the at least one pin slot being a plurality of pin slots; and
    the plurality of pin slot being positioned along the offsetting structure.

2. The detachable footstep for stake pockets on a trailer as claimed in claim 1 comprises:
    the pocket connector comprises a first hook and a second hook;
    the offsetting structure comprises a first sidewall and a second sidewall;
    the first sidewall and the second sidewall being positioned parallel and offset to each other;
    the footstep being terminally connected in between the first sidewall and the second sidewall;
    the first hook being terminally connected to the first sidewall, opposite to the footstep; and
    the second hook being terminally connected to the second sidewall, opposite to the footstep.

3. The detachable footstep for stake pockets on a trailer as claimed in claim 1 comprises:
    the pocket connector comprises a base plate and a tube;
    the offsetting structure comprises a first sidewall and a second sidewall;
    the first sidewall and the second sidewall being positioned parallel and offset to each other;

the footstep being terminally connected in between the first sidewall and the second sidewall;
the base plate being terminally connected in between the first sidewall and the second sidewall, opposite the footstep;
the tube being connected onto the base plate; and
the tube being oriented towards the footstep.

4. The detachable footstep for stake pockets on a trailer as claimed in claim 3 comprises:
a central axis of the tube being positioned parallel and coincident with a normal axis of the footstep.

5. The detachable footstep for stake pockets on a trailer as claimed in claim 3 comprises:
a central axis of the tube being positioned parallel and offset with a normal axis of the footstep.

6. The detachable footstep for stake pockets on a trailer as claimed in claim 1 comprises:
the connector-locking mechanism comprises a securing pin and at least one pin slot;
the at least one pin slot traversing through the pocket connector;
the at least one pin slot being positioned offset from the offsetting structure; and
the at least one pin slot being engaged by the securing pin.

7. The detachable footstep for stake pockets on a trailer as claimed in claim 1 comprises:
the pocket connector comprises a female tube and a flange;
the offsetting structure comprises a male tube and an angled mount;
the flange being terminally connected to the female tube;
the male tube engaging the female tube, opposite the flange;
the angled mount being terminally connected to the male tube, opposite the female tube; and
the footstep being mounted onto the angled mount, offset from the male tube.

8. The detachable footstep for stake pockets on a trailer as claimed in claim 7 comprises:
the connector-locking mechanism comprises a securing pin, at least one pin slot, and a locking slot;
the locking slot laterally traversing through the female tube, offset from the flange;
the at least one pin slot traversing through the male tube, offset from the angled mount; and
the securing pin being engaged through the locking slot and the at least one pin slot.

9. The detachable footstep for stake pockets on a trailer as claimed in claim 1 comprises:
a spring-loaded actuator;
the footstep being rotatably connected to the offsetting structure; and
the spring-loaded actuator being operatively integrated into the rotatable connection between the footstep and the offsetting structure, wherein the spring-loaded actuator is used to selectively position the footstep perpendicular to the offsetting structure.

10. A detachable footstep for stake pockets on a trailer comprises:
a frame;
a footstep;
a slip-guard;
a connector-locking mechanism;
a spring-loaded actuator;
the frame comprises an offsetting structure and a pocket connector;
the footstep being terminally mounted to the offsetting structure;
the pocket connector being terminally mounted to the offsetting structure, opposite the footstep;
the slip-guard being mounted onto the footstep;
the connector-locking mechanism being operatively integrated into the frame, wherein the connector-locking mechanism is used to hold the pocket connector in place;
the footstep being rotatably connected to the offsetting structure; and
the spring-loaded actuator being operatively integrated into the rotatable connection between the footstep and the offsetting structure, wherein the spring-loaded actuator is used to selectively position the footstep perpendicular to the offsetting structure.

11. The detachable footstep for stake pockets on a trailer as claimed in claim 10 comprises:
the pocket connector comprises a first hook and a second hook;
the offsetting structure comprises a first sidewall and a second sidewall;
the first sidewall and the second sidewall being positioned parallel and offset to each other;
the footstep being terminally connected in between the first sidewall and the second sidewall;
the first hook being terminally connected to the first sidewall, opposite to the footstep; and
the second hook being terminally connected to the second sidewall, opposite to the footstep.

12. The detachable footstep for stake pockets on a trailer as claimed in claim 10 comprises:
the pocket connector comprises a base plate and a tube;
the offsetting structure comprises a first sidewall and a second sidewall;
the first sidewall and the second sidewall being positioned parallel and offset to each other;
the footstep being terminally connected in between the first sidewall and the second sidewall;
the base plate being terminally connected in between the first sidewall and the second sidewall, opposite the footstep;
the tube being connected onto the base plate; and
the tube being oriented towards the footstep.

13. The detachable footstep for stake pockets on a trailer as claimed in claim 12 comprises:
a central axis of the tube being positioned parallel and offset with a normal axis of the footstep.

14. The detachable footstep for stake pockets on a trailer as claimed in claim 12 comprises:
a central axis of the tube being positioned parallel and coincident with a normal axis of the footstep.

15. The detachable footstep for stake pockets on a trailer as claimed in claim 10 comprises:
the connector-locking mechanism comprises a securing pin and at least one pin slot;
the at least one pin slot traversing through the offsetting structure;
the at least one pin slot being positioned adjacent to the pocket connector; and
the at least one pin slot being engaged by the securing pin.

16. The detachable footstep for stake pockets on a trailer as claimed in claim 15 comprises:
the at least one pin slot being a plurality of pin slots; and
the plurality of pin slot being positioned along the offsetting structure.

17. The detachable footstep for stake pockets on a trailer as claimed in claim 10 comprises:
 the connector-locking mechanism comprises a securing pin and at least one pin slot;
 the at least one pin slot traversing through the pocket connector;
 the at least one pin slot being positioned offset from the offsetting structure; and
 the at least one pin slot being engaged by the securing pin.

* * * * *